United States Patent [19]
Breitenfellner et al.

[11] Patent Number: 4,623,562
[45] Date of Patent: Nov. 18, 1986

[54] PROCESS FOR PRODUCING LIGHT-REFLECTING BODIES

[75] Inventors: Franz Breitenfellner, Bensheim; Karl Leidig, Heppenheim; Thomas Kainmüller, Lindenfels, all of Fed. Rep. of Germany

[73] Assignee: Ciba-Geigy Corporation, Ardsley, N.Y.

[21] Appl. No.: 802,898

[22] Filed: Nov. 27, 1985

[30] Foreign Application Priority Data

Dec. 3, 1984 [CA] Canada .................................. 5747/84

[51] Int. Cl.$^4$ .............................................. B05D 3/00
[52] U.S. Cl. .................................... 427/296; 524/605; 524/447
[58] Field of Search ......................... 427/296; 524/605

[56] References Cited

U.S. PATENT DOCUMENTS 4,429,004  1/1984  Breitenfellner .

FOREIGN PATENT DOCUMENTS 2719429 11/1978 Fed. Rep. of Germany .
2017127 10/1979 United Kingdom .

Primary Examiner—Lewis T. Jacobs
Attorney, Agent, or Firm—Luther A. R. Hall

[57] ABSTRACT

A process for producing light-reflecting bodies is described. The wall of the light-reflecting body consists of a polyalkylene terephthalate and/or a copolyester thereof, containing in each case 10–40% by weight of a finely-divided filler, a light-reflecting metal layer being applied directly to at least one surface of the wall. According to the novel process, a polyester moulding compound containing:

(a) 90–60% by weight of a polyalkylene terephthalate and/or copolyester thereof, or of a mixture of polyalkylene terephthalates, and
(b) 10–40% by weight of a finely-divided filler is subjected before shaping, at elevated temperature but at a temperature below the melting point of the moulding compound, to a vacuum treatment.

16 Claims, No Drawings

PROCESS FOR PRODUCING LIGHT-REFLECTING BODIES

The invention relates to a process for producing light-reflecting bodies, and to the light-reflecting bodies obtained by the process.

Light-reflecting bodies, especially motorcar headlights, the wall of which consists of a poly(1,4-butylene terephthalate) provided with 10–60% by weight of a filler having a particle size of at most 30 μm (micrometer) are described in the European patent application No. 43 797 A2. The fillers used are: kaolin, talc, mica, wollastonite, glass beads, zinc sulfide, lithopones, calcium sulfate and barium sulfate; and a light-reflecting metal layer is applied—optionally over a lacquer interlayer—to at least one surface of the wall. In the British Patent Specification No. 2,017,127 is described the use of poly(1,4-butylene terephthalate) and poly(1,4-cyclohexylenedimethylene terephthalate) moulding compounds containing calcium carbonate and optionally further fillers for producing light-reflecting bodies. It is known from the German Auslegeschrift No. 2,719,429 that polyalkylene terephthalates containing inorganic white pigments and stabilisers are suitable for producing, inter alia, reflectors.

The present invention relates to a novel process for producing light-reflecting bodies of which the wall consists of a polyalkylene terephthalate and/or a copolyester thereof, or of a mixture of polyalkylene terephthalates, containing in each case 10–40% by weight of a finely-divided filler, a light-reflecting metal layer being applied directly to at least one surface of the wall, in which process a polyester moulding compound containing:

(a) 90–60% by weight of a polyalkylene terephthalate and/or copolyester thereof, or of a mixture of polyalkylene terephthalates, and (b) 10–40% by weight of a finely-divided filler.

is subjected before shaping, at elevated temperature but at a temperature below the melting point of the moulding compound, to a vacuum treatment. The weight percentages are relative to the sum of (a) and (b).

The polyalkylene terephthalates and copolyesters thereof used in the process according to the invention can be for example those based on linear or branched alkylenediols having 2–12, particularly 2–6, C atoms, such as ethylene glycol, 1,2- or 1,3-propanediol, 1,4-butanediol, 1,5-pentanediol, neopentyl glycol, 1,6-hexanediol and 1,12-dodecanediol. The alkylenediols are preferably linear and contain in particular 2–4 C atoms. Preferably used are especially mixtures of poly(1,4-butylene terephthalate) and polyethylene terephthalate, poly(1,4-butylene terephthalate) and/or copolyesters based on poly(1,4-butylene terephthalate). Suitable copolyesters based on poly(1,4-butylene terephthalate) are particularly those in which, relative to the polyester, up to 25 mol %, preferably 0.5 to 15 mol %, of the terephthalic acid radicals or of the 1,4-butanediol radicals are replaced by other dicarboxylic acid radicals or other diol radicals.

Examples of dicarboxylic acids as co-components are linear or branched aliphatic dicarboxylic acids, in particular those having 2–40, especially 4–10, C atoms, such as oxalic acid, malonic acid, succinic acid, dodecyland octadecylsuccinic acid, pimelic acid, adipic acid, trimethyladipic acid, sebacic acid, azelaic acid and dimeric acids (dimerisation products of unsaturated $C_{10}$–$C_{20}$-aliphatic carboxylic acids, such as oleic acid); cycloaliphatic dicarboxylic acids having 6–10 C atoms, such as 1,3-cyclobutanedicarboxylic acid, 1,3-cyclopentanedicarboxylic acid, 1,3- and 1,4-cyclohexanedicarboxylic acid, 1,3- and 1,4-methylcyclohexanedicarboxylic acid and 4,4'-dicyclohexyldicarboxylic acid; or aromatic dicarboxylic acids having for example 8–14 C atoms, such as isophthalic acid, phthalic acid, 1,3-, 1,4-, 2,6- or 2,7-naphthalenedicarboxylic acid, 4,4'-biphenyldicarboxylic acid, 4,4'-diphenylsulfonedicarboxylic acid, 1,1,3-trimethyl-5-carboxyl-3-(p-carboxyphenyl)indane, 4,4'-diphenyletherdicarboxylic acid and 4,4'-diphenylmethanedicarboxylic acid.

Examples of diols as co-components are linear or branched aliphatic diols of the type mentioned above (with the exception of 1,4-butanediol), cycloaliphatic diols, such as 1,3- and 1,4-dihydroxycyclohexane, and aromatic diols, such as hydroquinone and resorcinol, and particularly bisphenols of the formula I

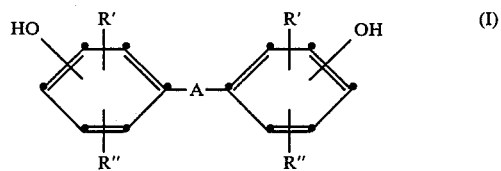

wherein the OH groups are in the m-position and especially in the p-position, and R' and R" are alkyl having 1–6 C atoms, halogen, such as chlorine or bromine, and in particular hydrogen atoms. A can be a direct bond, or can be O, S, $SO_2$, —$C_pC_{2p}$— where p=1–4, and particularly —$CH_2$— or —$C(CH_3)_2$—. Examples of such bisphenols are: bis(p-hydroxyphenyl) ether or -thioether, bis(p-hydroxyphenyl)sulfone, bis(p-hydroxyphenyl)methane, 1,2-bis(p-hydroxyphenyl)ethane, 2,2-bis(4-hydroxy-3-methylphenyl)propane, 1,1- or 2,2-bis(p-hydroxyphenyl)butane, 2,2-bis(3,5-dibromo-4-hydroxyphenyl)propane [tetrabromo-bisphenol A] and especially 2,2-bis(p-hydroxyphenyl)propane [bisphenol A].

Further suitable diols are for example: 1,1-bis(p-hydroxyphenyl)cyclohexane [bisphenol C]; β-hydroxyalkylated, particularly β-hydroxyethylated, bisphenols, such as 2,2-bis[4-(β-hydroxyethoxy)phenyl]propane, 1,4-bis(hydroxymethyl)cyclohexane; aromatic-aliphatic diols, such as p-dihydroxymethylbenzene or 2,5-dichloro-p-dihydroxymethylbenzene; polyalkylene glycols, such as diethylene glycol, triethylene glycol or polyethylene glycols, and also diols containing N,N'-heterocyclic rings, such as N,N'-(2-hydroxyethyl)-5,5-dimethylhydantoin, N,N'-(2-hydroxyethyl)benzimidazolone and N,N'-(2-hydroxyethyl)-4,5,6,7-tetrabromobenzimidazolone.

The polyalkylene terephthalates can also be branched by tri- or tetrahydric alcohols or tri- or tetrabasic acids. Suitable branching agents are for example: trimellitic acid, pyromellitic acid, 1,1,1-trimethylolpropane and pentaerythritol.

The copolyesters contain as co-components preferably radicals of 2,2-bis[4-(β-hydroxyethoxy)phenyl]propane, especially in an amount of 0.5–10 mol %, in particular in an amount of 2–10 mol %, relative to the diol components.

As component (a) in the process according to the invention, there are preferably used mixtures of poly(1,4-butylene terephthalate) and polyethylene terephthalate, poly(1,4-butylene terephthalate), poly(1,4- butylene terephthalate)-copolyesters with 0.5–10 mol %, especially 2–10 mol %, of 2,2-bis[4-(β-hydroxyethoxy)phenyl]propane radicals, or mixtures of poly(1,4-butylene terephthalate) and the stated copolyester. The proportion of component (a) is preferably 90–70 % by weight, particularly 90–80% by weight.

Suitable finely-divided fillers (b) are especially those having a mean particle size below 30 μm, preferably below 20 μm. Particularly good results with regard to well-balanced mechanical properties and good surface properties are obtained with fillers having a mean particle size of less than 5 μm.

The fillers can be in any desired form, for example in the form of powders, granulate, lamella, small beads or short fibres. Suitable fillers are for example: quartz, kaolin, talc, mica, graphite, wollastonite, glass beads, lithopones, calcium carbonate and calcium sulfate, barium carbonate and barium sulfate, magnesium carbonate and magnesium sulfate and inorganic white pigments, for example: zinc sulfide, zinc oxide, magnesium titanate, calcium titanate, titanium phosphate and in particular titanium dioxide. Preferred fillers are glass beads, talc, mica and kaolin, and more especially titanium dioxide. The fillers (b) are preferably used in an amount of 10–30% by weight, especially 20–30% by weight.

The moulding compounds to be used according to the invention can also contain further customary additives, for example: reinforcing fillers, such as carbon and particularly glass fibres, stabilisers, flow-promoting agents, mould-release agents, crystallisation accelerators and fire-retarding additives. Suitable fire-retarding additives are for example: organic halogen compounds, particularly chlorine or bromine compounds, which can be used on their own or together with synergistically acting compounds having elements of the fifth main group of the periodic system, especially phosphorus and antimony compounds, preferably antimony trioxide.

Suitable organic halogen compounds are for example: polytribromostyrene, octabromodiphenyl ether, decabromodiphenyl ether, tetrabromobisphenol A, N,N′-ethylene-bis-tetrabromophthalimide and poly(pentabromobenzyl)acrylate.

The vacuum treatment of the moulding compounds to be used according to the invention is performed advantageously at temperatures of between 100° and 200° C., preferably between 120° and 180° C., and especially between 140° and 160° C. The vacuum is preferably below 900 mbar, particularly below 200 mbar, and especially below 10 mbar. The duration of the heat treatment can vary within wide limits; it is preferably however at least ½ hour, and more especially preferred at least 3 hours.

The shaping into light-reflecting bodies is performed by customary processes, preferably by the injection-moulding process. The mould temperatures are in general between about 20° and 120° C., whilst the cylinder temperatures are advantageously between 240° and 280° C.

After shaping, the surface to be reflecting of the light-reflecting bodies is provided, in a manner known per se, with a metal layer, preferably by vapour deposition of aluminium.

The process according to the invention is suitable for producing various light-reflecting bodies in the form of convex, concave or plane mirrors, for example for producing headlight reflectors, reflectors for rear lamps, reflectors for traffic lights or indicator lamps. A preferred field of application is that covering headlamps for motor vehicles.

The light-reflecting bodies obtained by the process according to the invention are distinguished by an improved surface quality and by a high light efficiency of the metallic mirror applied by vapour deposition. The good surface quality renders possible a direct coating by vaporising of the wall with metal to obtain a metallised surface, so that the application of a lacquer interlayer for improving the surface quality can be dispensed with. The light-reflecting bodies produced according to the invention retain, even at fairly high service or ambient temperatures, their reflecting properties, and a gradual formation of dull or lustreless areas on the mirror layer deposited by vaporisation does not occur.

The process according to the invention is further illustrated by the following Example.

EXAMPLE

A moulding compound consisting of:
50.0% by weight of poly(1,4-butylene terephthalate),
30.0% by weight of co-poly(1,4-butylene terephthalate) with 7.5 mol % of 2,2-bis[4-(β-hydroxyethoxy)phenyl]propane, and
20.0% by weight of a TiO$_2$ white pigment,
having a viscosity number of 105 cm$^3$/g according to DIN Standard 53728, is pretreated, before the injection-moulding operation, at 150° C. in vacuo (1.33 mbar) for 3 hours. The moulding compound is subsequently injection-moulded, at a cylinder temperature of 250° C., a cycle time of 45 seconds and a mould temperature of 90° C., into the form of plates having dimensions of 100×100×2 mm. The moulded specimen is provided on the one side with a metal coating by vacuum metallisation with aluminium. The surface obtained exhibits a high lustre, and this lustre does not deteriorate even after storage for 6 hours in air.

What is claimed is:

1. Process for producing light-reflecting bodies of which the wall consists of a polyalkylene terephthalate and/or a copolyester thereof, or of a mixture of polyalkylene terephthalates, containing in each case 10–40% by weight of a finely-divided filler, a light-reflecting metal layer being applied directly to at least one surface of the wall, in which process a polyester moulding compound containing:
   (a) 90–60% by weight of a polyalkylene terephthalate and/or copolyester thereof, or of a mixture of polyalkylene terephthalates, and
   (b) 10–40% by weight of a finely-divided filler is subjected before shaping, at elevated temperature but at a temperature below the melting point of the moulding compound, to a vacuum treatment.

2. Process according to claim 1, wherein the component (a) used is a mixture of poly(1,4-butylene terephthalate) and polyethylene terephthalate.

3. Process according to claim 1, wherein the component (a) used is poly(1,4-butylene terephthalate).

4. Process according to claim 1, wherein the component (a) used is a poly(1,4-butylene terephthalate)-copolyester with 0.5–10 mol % of 2,2-bis[4-(β-hydroxyethoxy)phenyl]-propane radicals, or a mixture of poly(1,4-butylene terephthalate) and a poly(1,4-butylene terephthalate)copolyester with 0.5–10 mol % of 2,2-bis[4-(β-hydroxyethoxy)phenyl]propane radicals.

5. Process according to claim 1, wherein the component (b) used is a finely-divided filler having a mean particle size of below 30 μm.

6. Process according to claim 1, wherein the component (b) used is a finely-divided filler having a mean particle size of below 20 μm.

7. Process according to claim 1, wherein the component (b) used is a finely-divided filler having a mean particle size of below 5 μm.

8. Process according to claim 1, wherein the component (b) used is selected from the group comprising: glass beads, talc, mica and kaolin.

9. Process according to claim 1, wherein the component (b) used is titanium dioxide.

10. Process according to claim 1, wherein the proportion of component (a) is 90–70% by weight, and the proportion of component (b) is 10–30% by weight.

11. Process according to claim 1, wherein the proportion of component (a) is 90–80% by weight, and the proportion of component (b) is 10–20% by weight.

12. Process according to claim 1, wherein the vacuum treatment is performed at a temperature of between 100° and 200° C.

13. Process according to claim 1, wherein the vacuum treatment is performed at a temperature of between 120° and 180° C.

14. Process according to claim 1 or 12, wherein the vacuum treatment is performed in a vacuum of below 900 mbar.

15. Process according to claim 1 or 12, wherein the vacuum treatment is performed in a vacuum of below 200 mbar.

16. Process according to claim 1 or 12, wherein the vacuum treatment is performed in a vacuum of below 10 mbar.

* * * * *

UNITED STATES PATENT AND TRADEMARK OFFICE
CERTIFICATE OF CORRECTION

PATENT NO. : 4,623,562

DATED : NOVEMBER 18, 1986

INVENTOR(S) : FRANZ BREITENFELLNER, KARL KEIDIG, THOMAS KAINMÜLLER

It is certified that error appears in the above—identified patent and that said Letters Patent is hereby corrected as shown below:

On the cover page, Foreign Application Priority Data, Item [30], should read --
Dec. 3, 1984 [CH]  Switzerland ........... 5747/84      --.

Signed and Sealed this

Seventeenth Day of November, 1987

Attest:

DONALD J. QUIGG

Attesting Officer

Commissioner of Patents and Trademarks